(12) United States Patent
Liang et al.

(10) Patent No.: US 12,431,725 B2
(45) Date of Patent: Sep. 30, 2025

(54) MOBILE POWER SUPPLY RENTAL DEVICE

(71) Applicant: SHENZHEN ZHUMANG TECHNOLOGY CO., LTD., Shenzhen (CN)

(72) Inventors: Kai Liang, Shenzhen (CN); Chunren Zhong, Shenzhen (CN); Liang He, Shenzhen (CN)

(73) Assignee: SHENZHEN ZHUMANG TECHNOLOGY CO., LTD., Shenzhen (CN)

( * ) Notice: Subject to any disclaimer, the term of this patent is extended or adjusted under 35 U.S.C. 154(b) by 729 days.

(21) Appl. No.: 17/837,065

(22) Filed: Jun. 10, 2022

(65) Prior Publication Data

US 2022/0302723 A1    Sep. 22, 2022

Related U.S. Application Data

(63) Continuation of application No. PCT/CN2020/128496, filed on Nov. 13, 2020.

(30) Foreign Application Priority Data

Nov. 13, 2019 (CN) .......................... 201911108680.8
Nov. 13, 2019 (CN) .......................... 201921958041.6

(51) Int. Cl.
*H01M 10/46* (2006.01)
*H02J 7/00* (2006.01)

(52) U.S. Cl.
CPC ........ *H02J 7/0045* (2013.01); *H02J 7/00034* (2020.01); *H02J 7/0044* (2013.01)

(58) Field of Classification Search
CPC .... H02J 7/00034; H02J 7/0045; H02J 7/0044; H02J 7/0042; H02J 7/0013
(Continued)

(56) References Cited

U.S. PATENT DOCUMENTS

| 3,696,283 | A | * | 10/1972 | Ackley, III | ......... | H02J 7/00047 |
| | | | | | | 320/DIG. 19 |
| 11,165,266 | B2 | * | 11/2021 | Johnson | ............ | H01M 10/0525 |
| 2016/0372949 | A1 | | 12/2016 | Mccaffrey et al. | | |

FOREIGN PATENT DOCUMENTS

| CN | 202696216 U | 1/2013 |
| CN | 204012852 U | 12/2014 |

(Continued)

OTHER PUBLICATIONS

Machine translation of CN108599301A (Sep. 28, 2018) (Year: 2018).*

(Continued)

*Primary Examiner* — Edward Tso (57) ABSTRACT

A mobile power supply rental device includes a host and at least one charging cabinet unit. The at least one charging cabinet unit includes battery compartments configured to receive mobile power supplies, charging terminals configured to charging the mobile power supplies received in the battery compartments, a power input terminal, a power output terminal configured to output the current, and a circuit board electrically connected between the power input terminal and the charging terminals. The power input terminal is configured to input current. The power output terminal is configured to output the current. The host is detachably stacked on the at least one charging cabinet unit, and/or when multiple charging cabinet units are provided, each of the charging cabinet units are detachably stacked on an adjacent charging cabinet unit.

24 Claims, 7 Drawing Sheets

(58) Field of Classification Search
USPC .......................... 320/107, 110, 114, 115, 116
See application file for complete search history.

(56) References Cited

FOREIGN PATENT DOCUMENTS

| | | |
|---|---|---|
| CN | 107393177 A | 11/2017 |
| CN | 206805891 U | 12/2017 |
| CN | 108599301 A | 9/2018 |
| CN | 110829529 A | 2/2020 |
| CN | 211015744 U | 7/2020 |
| CN | 211239365 U | 8/2020 |

OTHER PUBLICATIONS

International Search Report issued in corresponding International application No. PCT/CN2020/128496, mailed Feb. 19, 2021.
Written Opinion of the International Searching Authority for No. PCT/CN2020/128496.

* cited by examiner

MOBILE POWER SUPPLY RENTAL DEVICE

CROSS-REFERENCE TO RELATED APPLICATION

The present application claims foreign priority to Chinese Patent Application No. 201911108680.8, titled: MOBILE POWER SUPPLY RENTAL DEVICE, filed on Nov. 13, 2019 in the State Intellectual Property Office of China and Chinese Patent Application No. 201921958041.6, titled: MOBILE POWER SUPPLY RENTAL DEVICE, filed on Nov. 13, 2019 in the State Intellectual Property Office of China, and the entire contents of which is hereby incorporated by reference.

TECHNICAL FIELD

The present disclosure relates to a technical field of electronic products, in particular to a mobile power supply rental device.

BACKGROUND

At present, in a field of mobile power supply market, multiple charging cabinet units of a mobile power supply rental equipment are powered independently and are not communicated with each other. The charging cabinet units are configured to store and charge a plurality of mobile power supplies. When multiple charging cabinet units are used at a same time, it is necessary to provide multiple power sockets. In occasions where demand for the mobile power supplies is large, the supply of the mobile power supplies is often in short. At present, the problem of large demand for the power bans is basically solved by increasing the number of charging cabinet units. However, it is necessary to provide a large numbers of power sockets and power charging cables equal to the number of charging cabinet units when the number of the charging cabinet units increases, which leads to an increase in market input costs. Moreover, due to limitation of the number of the power socket and/or a length of the power charging cables, the number of the charging cabinet units that can be stacked in the limited volume of the mobile power supply rental device is limited. Therefore, in order to provide more charging cabinet units, it is generally necessary to place multiple mobile power supply rental devices or increase a capacity of each charging cabinet unit, which easily lead to a large occupation area of the mobile power supply rental devices and affect business activities of merchants.

SUMMARY

The present disclosure provides a mobile power supply rental device, which aims to solve problems in the prior art.

The present disclosure provides a mobile power supply rental device.

The mobile power supply rental device comprises a host and at least one charging cabinet unit.

The at least one charging cabinet unit comprises one or more battery compartments configured to receive a respective mobile power supply, one or more charging terminals configured to charging the mobile power supplies received in the battery compartments, a power input terminal configured to input current, a power output terminal configured to output the current, and a circuit board electrically connected between the power input terminal and the charging terminals.

The host is detachably stacked on the at least one charging cabinet unit, and/or when multiple charging cabinet units are provided, each of the charging cabinet units are detachably stacked on an adjacent charging cabinet unit. The power input terminal of each of the charging cabinet units is electrically connected with the power output terminal of the adjacent charging cabinet unit. The host is electrically connected with the power input terminal or the power output terminal of a closest charging cabinet unit.

Furthermore, each of the charging cabinet units further comprises a housing. Each power output terminal is a power output female base. Each power output female base extends out from a first end of each housing. Each power input terminal is a power input male head. An accommodating cavity corresponding to a position of each power output female base is provided on a second end of each housing. Each power input male head is arranged in a corresponding accommodating cavity. When the charging cabinet units are connected together, the power output female base of each of the charging cabinet units is snapped into the accommodating cavity of the adjacent charging cabinet unit and is plugged with the power input male head arranged in the accommodating cavity of the adjacent charging cabinet unit.

Furthermore, a first mounting plate is detachably connected with the first end of the housing of each of the charging cabinet units and a second mounting plate is detachably connected with the second end of the housing of each of the charging cabinet units. Each first mounting plate is configured to fix a corresponding power output female base. Each second mounting plate is configured to fix a corresponding power input male head.

Furthermore, positioning grooves are provided on the first end of the housing of each of the charging cabinet units. Positioning bumps are arranged on the second end of the housing of each of the charging cabinet units. When the charging cabinet units are connected together, the positioning bumps of the housing of each of the charging cabinet units are snapped into the positioning grooves of the housing of the adjacent charging cabinet unit.

Furthermore, the positioning bumps of each housing comprise a main positioning bump arranged in a middle portion of the second end of each housing and auxiliary positioning bumps arranged away from the main positioning bump. The positioning grooves of each housing comprise a main positioning groove provided on a middle portion of the first end of each housing and auxiliary positioning grooves provided away from the main positioning groove. When the charging cabinet units are connected together, the main positioning bump of the housing of each of the charging cabinet units is snapped into the main positioning groove of the housing of the adjacent charging cabinet unit; the auxiliary positioning bumps of the housing of each of the charging cabinet units are snapped into the auxiliary positioning grooves of the housing of the adjacent charging cabinet unit.

Furthermore, in a direction along which the charging cabinet units are stacked, the main positioning bump and the auxiliary positioning bumps of each housing are arranged at a lower end of each housing. A raised height of each of the auxiliary positioning bumps or a total height of each of the auxiliary positioning bumps after mounting a foot pad is greater than a raised height of each main positioning bump.

Furthermore, the positioning bumps of each housing comprise a side positioning bump at an edge position of the first end of each housing. The positioning grooves of each housing comprise a side positioning groove provided on the second end of each housing. When the charging cabinet units are connected together, the side positioning bump of the housing of each of the charging cabinet units is snapped into the side positioning groove of the housing of the adjacent charging cabinet unit.

Furthermore, a portion of the side positioning groove of each housing facing the second end of each housing is open.

Furthermore, a wiring groove communicating the accommodating cavity and the side positioning groove of the housing of each of the charging cabinet units is provided on the housing of each of the charging cabinet units.

Furthermore, the positioning bumps of each housing comprise side connecting bumps arranged on an edge position of the first end of each housing. The positioning grooves of each housing comprise side connecting grooves provided on the second end of the housing. A fixing hole is defined on each of the side connecting bumps. When the charging cabinet units are connected together, the side connecting bumps of the housing of each of the charging cabinet units are connected with the side connecting grooves of the housing of the adjacent charging cabinet unit through a connecting piece mounted in each fixing hole.

Furthermore, each of the charging cabinet units further comprises module bodies, locking mechanisms, and power mechanisms. Each of the module bodies comprises at least two battery compartments. Each of the battery compartments is equipped with a corresponding locking mechanism. Each two adjacent battery compartments are equipped with a correspondingly power mechanism. Each of the power mechanisms comprises a motor capable of rotating forwardly and reversely and an unlocking mechanism driven by the motor. When each motor rotates forwardly or reversely, each unlocking mechanism pushes a corresponding locking mechanism of a corresponding battery compartment to move, so the corresponding battery compartment is not locked by the corresponding locking mechanism.

Furthermore, each unlocking mechanism comprises a turning disc fixedly connected with an output shaft of each motor. Each turning disc comprises a pushing boss facing corresponding locking mechanisms. When each motor rotates, each pushing boss pushes a corresponding locking mechanism to move.

Furthermore, two sides of each pushing boss define pushing surfaces transitioning from each pushing boss to a surface of a corresponding turning disc. When each turning disc rotates, the pushing surfaces of each pushing boss gradually pushes the corresponding locking mechanism to move.

Furthermore, a side wall of each of the battery compartments defines a first through hole, and each of the locking mechanisms comprises a locking piece rotatably connected with a corresponding module body and a pressure-bearing piece connected with the locking piece. A first end of each locking piece comprise a snapping portion corresponding to a position of a corresponding first through hole. A second end of each locking piece is fixedly connected with a corresponding pressure-bearing piece. Each pressure-bearing piece is arranged opposite to a corresponding turning disc. Each pushing boss compresses a corresponding pressure-bearing piece when each turning disc rotates, so the first end of each locking piece moves away from a corresponding mobile power supply to unlock the corresponding mobile power supply arranged in a corresponding battery compartment.

Furthermore, each two locking pieces corresponding to each of the power mechanisms are rotatably connected with the corresponding module body by a same shaft. Each pushing boss pushes a corresponding locking piece to rotate around a corresponding shaft along the first direction.

Furthermore, each of the locking mechanisms further comprises an elastic reset mechanism configured to push a corresponding locking piece to lock the corresponding mobile power supply.

Furthermore, each elastic reset mechanism comprises a first pushing rod and a first elastic piece configured to push the first pushing rod. Each of the module bodies comprises a first mounting hole. A first elastic piece and a first end of the corresponding first pushing rod of each elastic reset mechanism are arranged in a corresponding first mounting hole. A second end of the first pushing rod of each elastic reset mechanism is configured to push a corresponding pressure-bearing piece under action of the first elastic piece of each elastic reset mechanism, so the corresponding pressure-bearing piece rotates around a corresponding shaft along a second direction. The second direction is opposite to the first direction.

Furthermore, each of the locking mechanisms further comprises a detection device. A trigger portion is arranged on each of the locking mechanisms. When each detection device detects that a corresponding trigger portion reaches a predetermined position. A corresponding motor no longer rotates in a current direction.

Furthermore, each detection device is a photoelectric switch.

Furthermore, an elastic pushing mechanism is arranged on each of the module bodies. Each elastic pushing mechanism comprises a second pushing rod and a second elastic piece configured to push the second pushing rod. One end of each second pushing rod toward an opening of a corresponding battery compartment extends into the corresponding battery compartment.

Furthermore, each of the battery compartments comprises a narrowed compartment section. Each narrowed compartment section gradually narrows along a direction in which each mobile power supply is inserted into each of the battery compartments. Each first through hole is on a side wall of a corresponding narrowed compartment section.

Furthermore, each of the charging cabinet units further comprises an adapter electrically connected between the power input terminal and the circuit board of each of the charging cabinet units.

In the present disclosure, through cooperation of the power input terminals and the power output terminals of the charging cabinet units, multiple charging cabinet units are stacked. Further, when the number of the charging cabinet units is increased, there is no need to increase the number of power sockets and power charging cables, which saves manufacturing costs and saves floor space.

The details of one or more embodiments of the present disclosure are set forth in the accompanying drawings and the description below. Other features and characteristics of the present disclosure will show clearly by the detail descriptions, drawings, and claims.

BRIEF DESCRIPTION OF DRAWINGS

The specific implementations of the present disclosure will be described in further detail below with reference to the accompanying drawings and embodiments. Obviously, the drawings in the following description only depict some embodiments of the present disclosure, and for those of ordinary skill in the art, other drawings can be obtained from these drawings without creative effort. In the drawings.

DETAILED DESCRIPTION

It should be noted that the embodiments in the present disclosure and the features of the embodiments might be combined with each other in the case of no conflict. Optional embodiments of the present disclosure are described below in detail with reference to the accompanying drawings. It should be understood that the specific embodiments described herein are only used to explain the present disclosure, instead of limiting the present disclosure.

Embodiment 1

As shown in FIGS. 1-5, the present disclosure provides a mobile power supply rental device.

Figure 1:
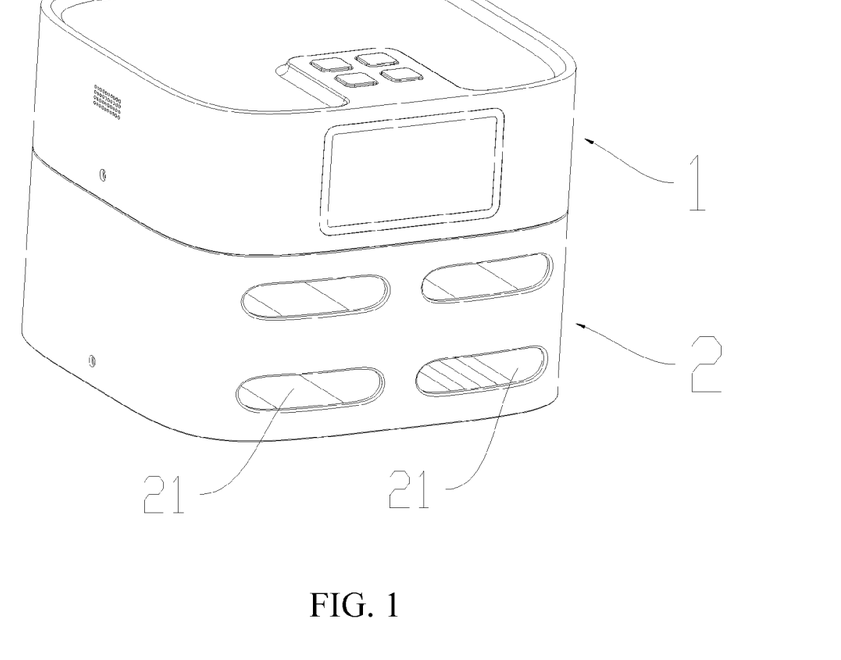
FIG. 1 is a perspective schematic diagram of a mobile power supply rental device according to one embodiment of the present disclosure.

The mobile power supply rental device comprises a host 1 and at least one charging cabinet unit 2.

The at least one charging cabinet unit 2 comprises one or more battery compartments 21, one or more charging terminals 22, a power input terminal 23, a power output terminal 24, a circuit board 25, and an adapter 26. The battery compartments 21 are configured to receive a respective mobile power supply 3. When each mobile power supply 3 is received in a corresponding battery compartment 21, each of the charging terminals 22 directly contact and charge a corresponding mobile power supply 3. The power input terminal 23 of one of the charging cabinet units 2 is electrically connected with a power socket. The current input through the power input terminal 23 of one of the charging cabinet units 2 is output from the power output terminal 24 of the one of the charging cabinet units 2 to the power input terminal 23 of another charging cabinet unit 2. Each adapter 26 is respectively connected with a corresponding power input terminal 23 and a corresponding circuit board 25. That is, each adapter 26 is electrically connected between the corresponding power input terminal 23 and the corresponding circuit board 25. A power input end (not shown in the drawings) of each adapter 26 is electrically connected with the corresponding power input terminal 23, and a power output end (not shown in the drawings) of each adapter 26 is electrically connected with the corresponding circuit board 25. Each of the charging terminals 22 is electrically connected with the corresponding circuit board 25. Each circuit board 25 outputs direct current to corresponding charging terminals 22 to charge corresponding mobile power supplies 3.

The host 1 is electrically connected with the charging cabinet units 2. The host 1 sends a control signal to the charging cabinet units 2 through wired or wireless communication to control the charging cabinet units 2. The host 1 is detachably stacked on the at least one charging cabinet unit 2. When multiple charging cabinet units 2 are provided, each of the charging cabinet units 2 are detachably stacked on an adjacent charging cabinet unit 2.

The host 1 and a closest charging cabinet unit 2 are electrically connected through the power output terminal 24 or the power input terminal 23 of the closet charging cabinet unit 2. That is, the power output terminal 24 of the closet charging cabinet unit 2 supplies power to the host 1, or the power input terminal 23 of the closest charging cabinet unit 2 is electrically connected with the power socket through the host 1. The power input terminal 23 of each of the charging cabinet units 2 is electrically connected with the power output terminal 24 of the adjacent charging cabinet unit 2, so each of the charging cabinet units 2 are electrically connected with the adjacent charging cabinet unit 2. When at least two charging cabinet units are stacked together, the power output terminals 24 and the power input terminals 23 of each two adjacent charging cabinet units 2 are cooperated with each other, and the closest charging cabinet unit 2 adjacent to the host 1 is electrically connected with the host 1. The current from the power socket is input through the host 1 or the power input terminal 23 of one of the charging cabinet units 2, and supplied to the host 1 of the mobile power supply rental device and each of the charging cabinet units 2.

In the present disclosure, through the cooperation of the power input terminals 23 and the power output terminals 24 of the charging cabinet units 2, multiple charging cabinet units 2 are stacked together. Further, when the number of the charging cabinet units 2 is increased, there is no need to increase the number of power sockets and power charging cables. Thus, the number of the charging cabinet units is not limited by the number of the power sockets and/or a length of power charging cables, which saves manufacturing costs and saves floor space. In addition, since the number of charging cabinet units 2 is increased by stacking upward, the floor space of the mobile power supply rental device is not increased.

In the embodiment, the host 1 is arranged at a top portion of the closet charging cabinet unit 2, which is convenient for a renter to scan a QR code to unlock one of the mobile power supplies 3. One or more charging cabinet units 2 are stacked under the host 1. A power supply charging cable is electrically connected with the power input terminal 23 of a lowermost charging cabinet unit 2. Through the cooperation between the power input terminals 23 and the power output terminals 24 of each two adjacent charging cabinet units 2 and the cooperation between the closest charging cabinet unit 2 and the host 1, the current is transmitted to each charging cabinet units 2 and the host 1. The charging cabinet units 2 are connected in parallel, so the voltages of the charging cabinet units 2 are the same, which is beneficial to stably supply current to each adapter 26 and each circuit board 25 to ensure the charging of the mobile power supplies 3.

In one embodiment, the current is commercial power. The commercial power is alternating current, and a voltage of the alternating current is generally 100-240V. The commercial power input through the power input terminal 23 of the lowermost charging cabinet unit 2 is output to the power input terminals 23 of the rest charging cabinet unit 2 through the power output terminal 24 of the lowermost charging cabinet unit 2. That is, both of the power input terminals 23 and the power output terminals 24 transmit alternating current. Each adapter 26 is configured to convert alternating current into direct current. Each adapter 26 converts the alternating current from the corresponding power input terminal 23 into direct current and output it to the corresponding circuit board 25. In other embodiments, the current may be 380V industrial power or direct current.

Figure 2:
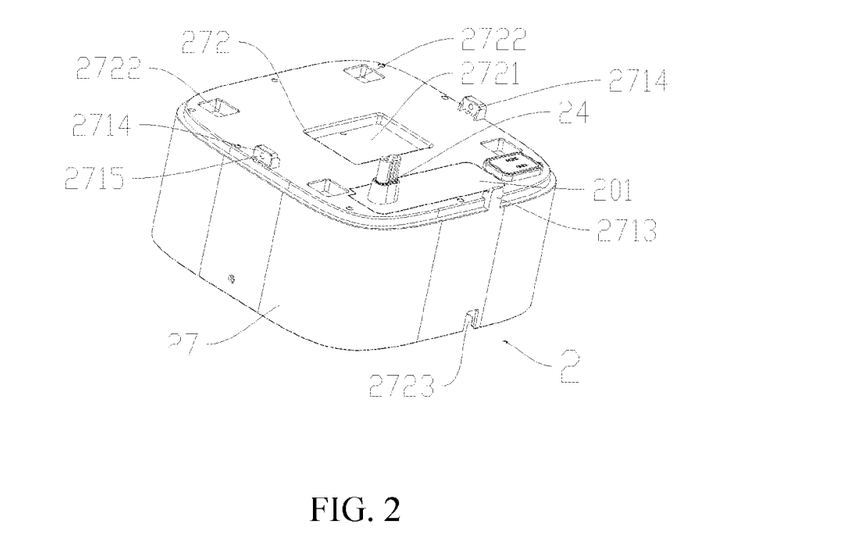
FIG. 2 is a schematic diagram of a charging cabinet unit according to one embodiment of the present disclosure.
Figure 3:
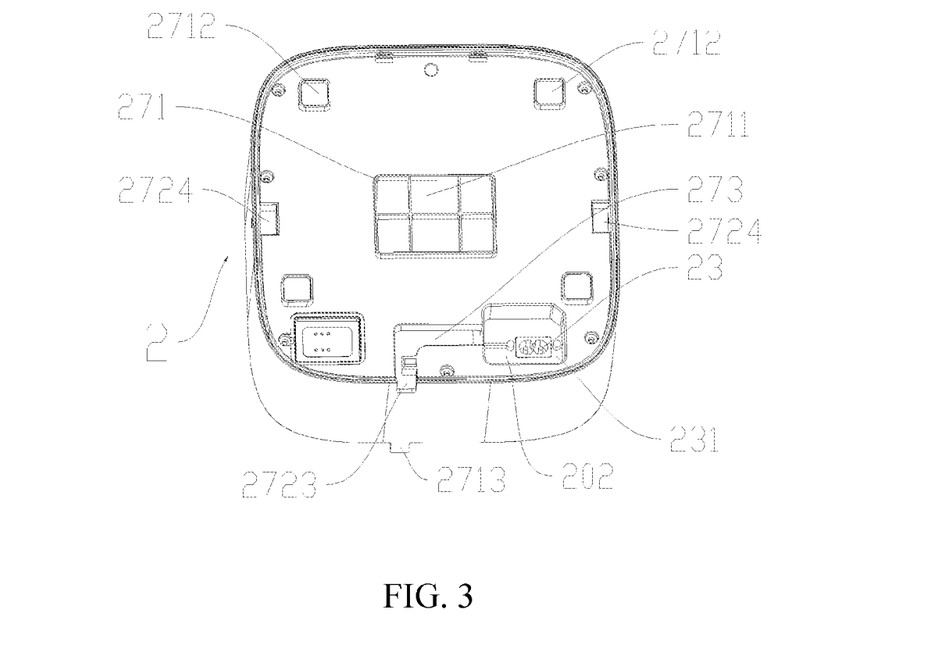
FIG. 3 is another schematic diagram of the charging cabinet unit according to one embodiment of the present disclosure.
Figure 5:
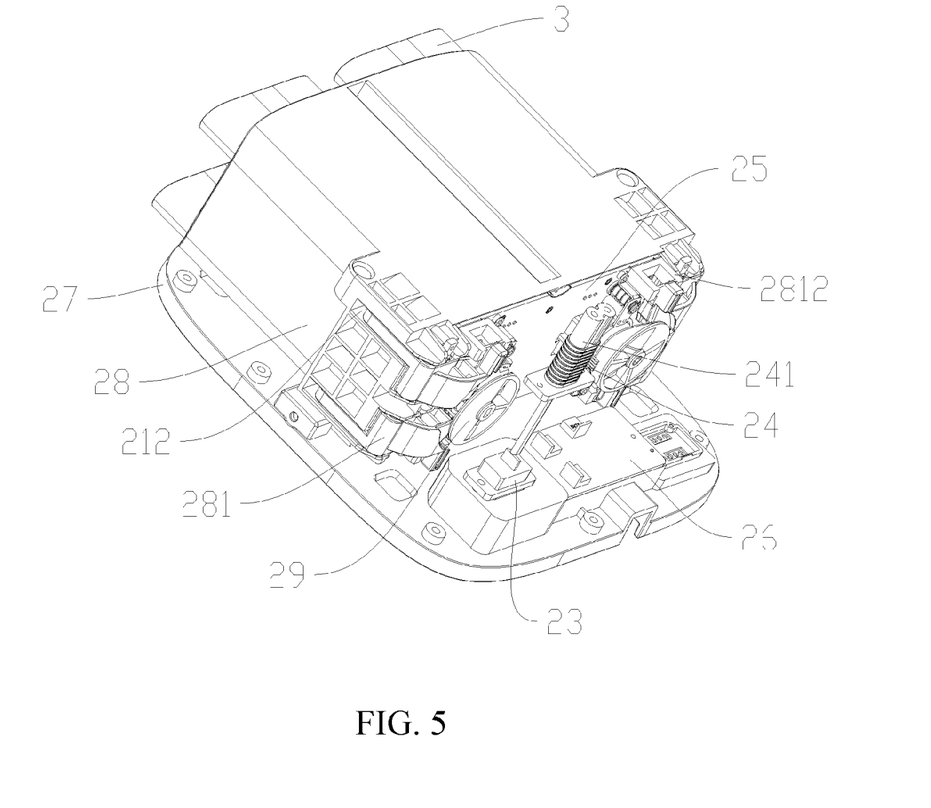
FIG. 5 is a partial schematic diagram of the charging cabinet unit according to one embodiment of the present disclosure.

As shown in FIGS. 2, 3, and 5, each of the charging cabinet units 2 further comprises a housing 27. Each power output terminal 24 is a power output female base. Each power output female base 24 extends out from a first end of each housing 27. An insulating layer 241 is wrapped around a conductor portion of each power output female base 24. Each insulating layer 241 extends along an extending direction of a corresponding conductor portion to wrap the corresponding conductor portion that leaks out of the corresponding housing 27 in the insulating layer 241, so as to prevent a staff from accidentally touching the corresponding conductor portion and getting an electric shock when stacking and adding charging cabinet units 2. Therefore, safety performance of the mobile power supply rental device is improved.

Each power input terminal 23 is a power input male head. An accommodating cavity 231 corresponding to a position of the power output female base of the adjacent charging cabinet unit is provided on a second end of each housing 27. Each power input male head is arranged in a corresponding accommodating cavity 231. Each accommodating cavity 231 is recessed into the corresponding housing 27, so that it is not easy for the staff to access the power input terminal 23 arranged in each accommodating cavity 231 during a process of carrying the charging cabinet units or mounting the charging cabinet units, which effectively eliminates the hidden danger of accidental electric shock. When the charging cabinet units 2 are connected together, the power output female base of each of the charging cabinet units is snapped into the accommodating cavity 231 of the adjacent charging cabinet unit 2 and is plugged with the power input male head arranged in the accommodating cavity 231 of the adjacent charging cabinet unit 2, which realize current transmission between any two adjacent charging cabinet units 2. The arrangement of the accommodating cavities 231 and the power output female bases also plays a role in enhancing connection between the host 1 and the closest charging cabinet unit 2 and connection between any two adjacent charging cabinet units 2.

In one embodiment, as shown in FIGS. 2 and 3, a first mounting plate 201 is detachably connected with the first end (an upper surface) of the housing 27 of each of the charging cabinet units 2 and a second mounting plate 202 is detachably connected with the second end (a lower surface) of the housing 27 of each of the charging cabinet units 2. Each first mounting plate 201 is configured to fix a corresponding power output female base. Each second mounting plate 202 is configured to fix a corresponding power input male head.

Each first mounting plate 201 and each second mounting plate 202 are detachably connected with a corresponding charging cabinet unit 2 by means of snap connection, screw connection or the like. Due to inconsistency of power cord plug among countries in the world, when the mobile power supply rental device enters other countries, it may be necessary to replace the power output female bases and power input male heads. Each first mounting plate 201 and each second mounting plate 202 are detachable, so when replacing the power output female bases and the power input male heads, it is only necessary to remove each first mounting plate 201 and each second mounting plate 202. Then, each power output female base connected with each first mounting plate 201 and each power input male head connected with each second mounting plate 202 are taken out, and then the power output female bases and power input male heads of different standards are assembled on the charging cabinet units 2, Thus, part replacement of the mobile power supply rental device is efficiently and economically realized.

As shown in FIGS. 2 and 3, positioning grooves 272 are provided on the first end of the housing 27 of each of the charging cabinet units 2. Positioning bumps 271 are arranged on the second end of the housing 27 of each of the charging cabinet units 2. The positioning grooves 272 and the positioning bumps 271 of each of the charging cabinet units 2 are respectively matched with the positioning bumps and positioning grooves on the housing 27 of the adjacent charging cabinet unit 2. When the charging cabinet units 2 are connected together, the positioning bumps 271 of the housing 27 of each of the charging cabinet units 2 are snapped into the positioning grooves of the housing of the adjacent charging cabinet unit 2. The host 1 also comprises positioning grooves 272 or positioning bumps 271 corresponding to positioning bumps 271 or positioning grooves 272 of the closest charging cabinet unit 2. The positioning protrusions 271 cooperate with the positioning grooves 272, which not only provide a guiding role for mounting of the host 1 and the closest charging cabinet unit 2, but also play a role in fixing the host 1 and the closest charging cabinet unit 2 and fixing any two adjacent charging cabinet units 2.

Furthermore, the positioning bumps 271 of each housing 27 comprise a main positioning bump 2711 arranged in a middle portion of the second end of each housing 27 and auxiliary positioning bumps 2712 arranged away from the main positioning bump 2711. The positioning grooves 272 of each housing 27 comprise a main positioning groove 2721 provided on a middle portion of the first end of each housing 27 and auxiliary positioning grooves 2722 provided away from the main positioning groove. When the charging cabinet units 2 are connected together, the main positioning bump 2711 of the housing 27 of each of the charging cabinet units 2 is snapped into the main positioning groove 2721 of the housing of the adjacent charging cabinet unit 2 and the auxiliary positioning bumps 2712 of the housing 27 of each of the charging cabinet units 2 are snapped into the auxiliary positioning grooves 2722 of the housing 27 of the adjacent charging cabinet unit 2. A raised height of each of the auxiliary positioning bumps 2712 or a total height of each of the auxiliary positioning bumps 2712 after mounting a foot pad is greater than a raised height of each main positioning bump 2711. The number of the auxiliary positioning bumps 2712 of each of the charging cabinet units 2 may be four. When the charging cabinet units 2 are connected with the power supply and works normally, the main positioning bump 2711 and the auxiliary positioning bumps 2712 of each housing 27 are arranged on a lower end of each housing 27, so that the auxiliary positioning bumps 2712 of the lowermost charging cabinet unit 2 are configured as support feet to support other charging cabinet units 2 and the host 1 stacked on the charging cabinet units 2.

In one embodiment, the positioning bumps 271 of each housing 27 comprise a side positioning bump 2713 at an edge position of the first end of each housing 27. The positioning grooves 272 of each housing 27 comprise a side positioning groove 2723 provided on the second end of each housing 27. When the charging cabinet units 2 are connected with each other, the side positioning bump 2713 of the housing 27 of each of the charging cabinet units 2 is snapped into the side positioning groove 2723 of the housing 27 of the adjacent charging cabinet unit 2. A portion of the side positioning groove 2723 of each housing facing the second end of each housing is open. In other words, the side positioning groove 2723 of each housing has an opening penetrating through at least one side wall of each housing 27. The arrangement of the side positioning bumps 2713 and the side positioning grooves 2723 provides guidance for the mounting of the charging cabinet units 2. A wiring groove 273 communicating the accommodating cavity 231 and the side positioning groove 2723 of the housing 27 of each of the charging cabinet units 2 is provided on the housing 27 of each of the charging cabinet units 2. The wiring groove 273 of each housing 27 is configured to install a power charging cable connected with the power supply. The power charging cable is embedded in a corresponding wiring groove 273, thereby saving the space occupied by the power charging cable, and making connection between the power charging cable and a corresponding power input terminal 23 tight.

Furthermore, the positioning bumps 271 of each housing 27 comprise side connecting bumps 2714 arranged on an edge position of the first end of each housing 27. The positioning grooves 272 of each housing 27 comprise side connecting grooves 2724 provided on the second end of the housing 27. When the charging cabinet units are connected together, the side connecting bumps 2714 of the housing of each of the charging cabinet units 2 are mounted in the side connecting grooves 2724 of the housing 27 of the adjacent charging cabinet unit 2. A fixing hole 2715 is defined on each of the side connecting bumps 2714. Each fixing hole 2715 cooperates with a groove wall of a corresponding side connecting groove 2724 through a connecting piece such as a screw or a screws rod (not shown in the drawings) to realize the fixed connection between each two adjacent charging cabinet units 2. That is, when the charging cabinet units 2 are stacked and placed, the connecting pieces such as screws and screw rods are inserted into the fixing holes 2715 of the side connecting bumps 2714 and the groove walls of the corresponding side connecting grooves 2724, so that the charging cabinet units 2 are connected together, preventing the charging cabinet units 2 from falling or falling off.

As shown in FIGS. 4-9, each of the charging cabinet units 2 further comprises module bodies 28, locking mechanisms 281, and power mechanisms 29. Each of the module bodies 28 comprises at least two battery compartments 21. Each of the battery compartments 21 is configured to receive the respective mobile power supply 3. Each of the battery compartments 21 is equipped with a corresponding locking mechanism 281. Each of the locking mechanisms 281 is configured to lock a corresponding mobile power supply 3 received in the corresponding battery compartment. In one embodiment, each of the locking mechanisms 281 is at least partially arranged in the corresponding battery compartment 21. When each mobile power supply 3 is received in the corresponding battery compartment 21, each of the locking mechanisms 281 extends into the corresponding battery compartment 21 to lock the corresponding mobile power supply 3 to prevent the mobile power supplies 3 from being stolen.

Each two adjacent battery compartments 21 are equipped with a correspondingly power mechanism 29. Each of the power mechanisms 29 comprises a motor 291 capable of rotating forwardly and reversely and an unlocking mechanism 292 driven by the motor 291. When each motor 291 rotates forwardly or reversely, each unlocking mechanism 292 pushes a corresponding locking mechanism 281 of a corresponding battery compartment 21 to move, so the corresponding locking mechanism 281 move out of the corresponding battery compartment 21 to unlock the mobile power supply 3 received in the corresponding battery compartment 21. That is, when one motor 291 rotates forwardly, the corresponding unlocking mechanism 292 pushes one of the two corresponding locking mechanisms 281 to move, and when the motor 291 rotate in reverse, the corresponding unlocking mechanism 292 pushes the other one of the two corresponding locking mechanisms 281 to move. After one of the corresponding locking mechanism 281 moves out of the corresponding battery compartment 21, the mobile power supply 3 received in the corresponding battery compartment 21 is unlocked, so that one motor 291 is able to unlock two mobile power supplies 3.

After one of the mobile power supplies 3 is unlocked, the user is able to take out the one of the mobile power supplies 3 from the corresponding battery compartment 21. Through cooperation of the unlocking mechanisms 292 and the motors 291, each motor 291 is able to unlock two mobile power supplies 3, thereby reducing the number of the motors 291 required for the module bodies, thereby reducing manufacturing costs of the module bodies of the mobile power supplies 3. Moreover, an overall structure of the mobile power supply rental device is compact and a size and a weight of the mobile power supply rental device are small.

Figure 6:
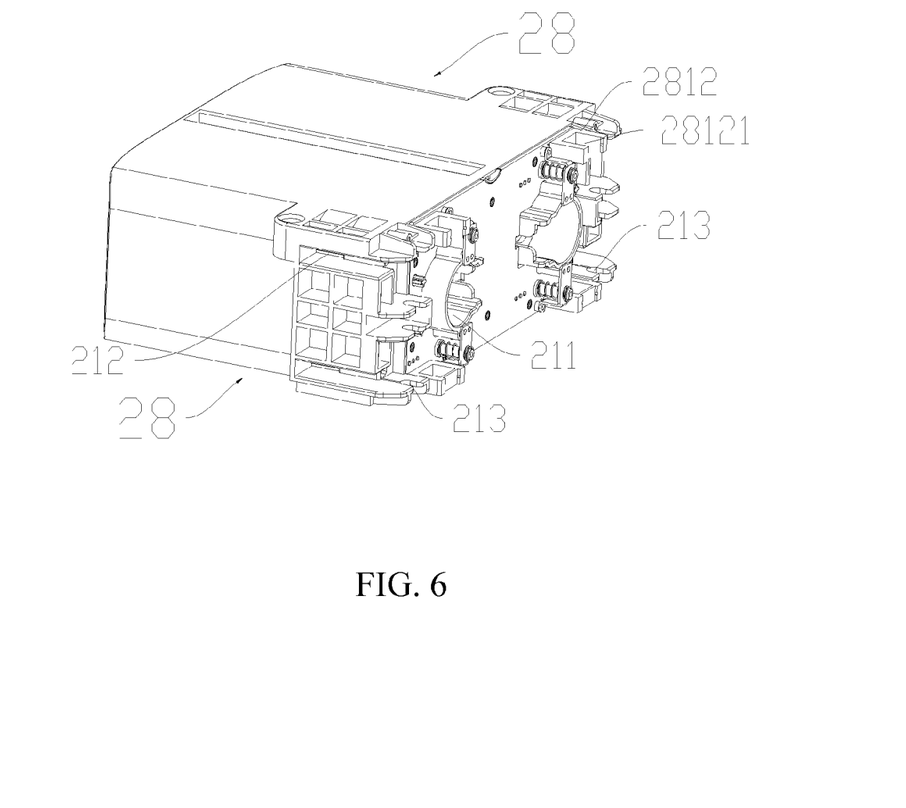
FIG. 6 is another partial schematic diagram of the charging cabinet unit according to one embodiment of the present disclosure.

Furthermore, a mounting cavity 211 configured to mount the motor 291 is provided on each of the module bodies 28. As shown in FIG. 6, fixing ears 2911 are arranged on two sides of each motor 291. The fixing ears 2911 is fixedly connected with an outer wall of a corresponding mounting cavity 211 by screws, rivets, screw rods and the like. By arranging the mounting cavity 211 configured to mount a corresponding motor on each of the module bodies 28, an overall structure of each of the module bodies 28 is reliable and compact.

Figure 7:
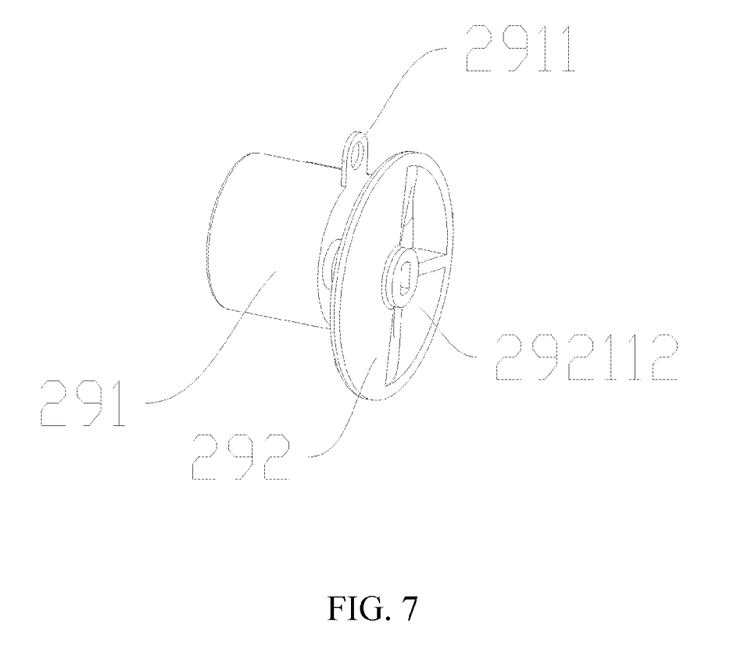
FIG. 7 is a schematic diagram of an unlocking mechanism according to one embodiment of the present disclosure.
Figure 8:
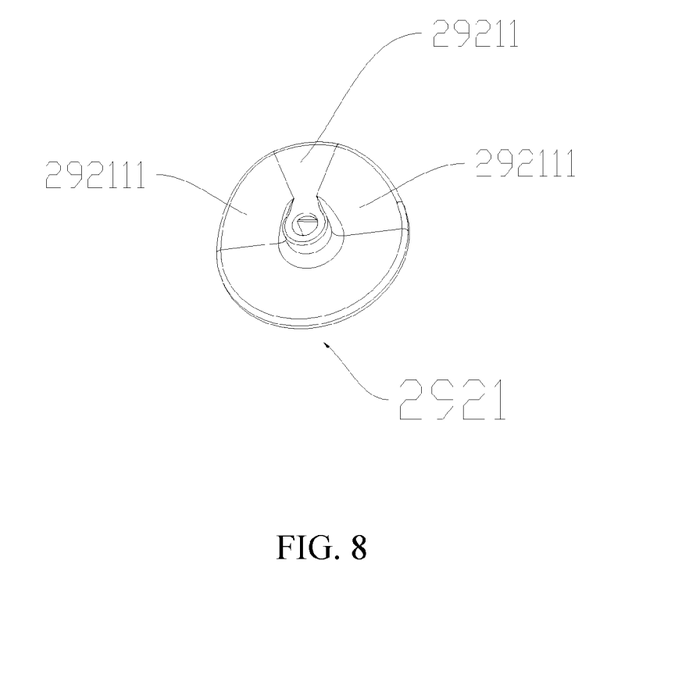
FIG. 8 is a schematic diagram of a turning disc according to one embodiment of the present disclosure.

As shown in FIGS. 5-7, in one embodiment, each unlocking mechanism 292 comprises a turning disc 2921 fixedly connected with an output shaft of each motor. 291. Each unlocking mechanism 292 is arranged between the corresponding two locking mechanisms 281. At least a portion of each turning disc 2921 is respectively opposite to corresponding two locking mechanisms 281. Each turning disc 2921 comprises a pushing boss 29211. When each motor rotates forwardly or reversely, each pushing boss 29211 rotates forwardly or reversely to push a corresponding locking mechanism to move. When one motor 291 rotates, the pushing boss 29211 of the one motor 29 pushes against the corresponding locking mechanism 281 to push the corresponding locking mechanism 281 to move, so as to unlock the corresponding mobile power supply 3.

Furthermore, two sides of each pushing boss define pushing surfaces 292111 transitioning from each pushing boss 29211 to a surface of a corresponding turning disc 2921. When each turning disc 2921 rotates, the pushing surfaces 292111 of each pushing boss 29211 gradually pushes the corresponding locking mechanism 281 to move to unlock the corresponding mobile power supply 3. Each pushing surface 292111 is, for example, an arc-shaped convex surface. A protruding thickness of each arc-shaped convex surface gradually increases from a surface of the corresponding turning disc 2921 to the corresponding pushing boss 29211. Each arc-shaped convex surface pushes against the corresponding locking mechanism 281 to push the corresponding locking mechanism 281 to move away from the corresponding mobile power supply 3, so as to unlock the corresponding mobile power supply 3. A concave cavity 292112 corresponding to the pushing surface 292111 is provided on one side of each turning disc e 2921 opposite to each pushing boss 29211. As shown in FIG. 7, arrangement of the concave cavities 292112 saves material costs of processing the unlocking mechanisms 292 and reduces a weight of the unlocking mechanisms 292. In other embodiments, each pushing surface 292111 may be an inclined surface.

Figure 9:
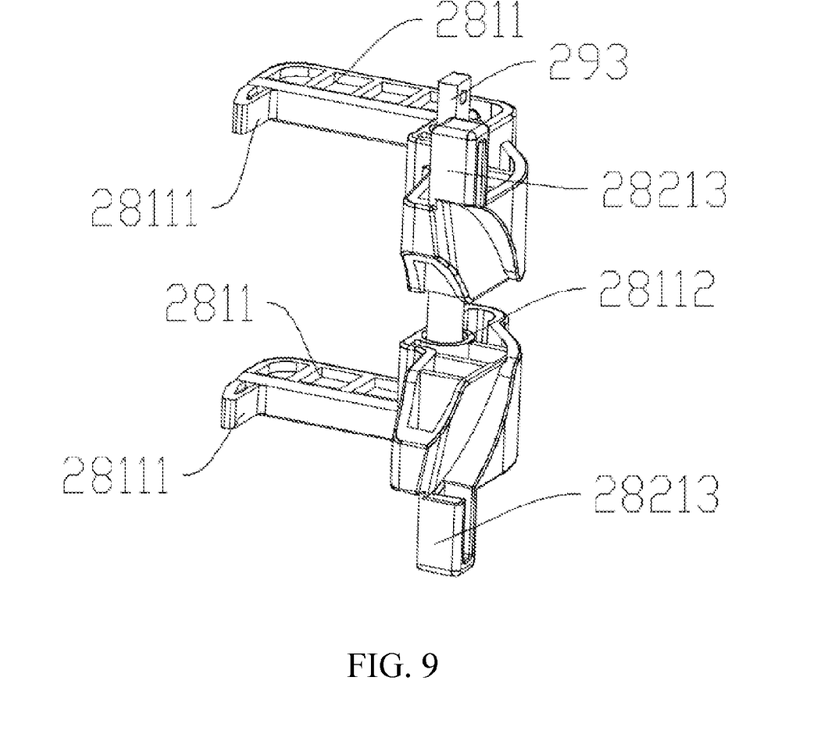
FIG. 9 is a schematic diagram of locking mechanisms according to one embodiment of the present disclosure.

As shown in FIGS. 5 and 9, a side wall of each of the battery compartments 21 defines a first through hole 212, and each of the locking mechanisms comprises a locking piece 2811 rotatably connected with a corresponding module body 28 and a pressure-bearing piece 2813 connected with the locking piece 2811. Each locking piece 2811 is matched with a corresponding first through hole 212, and each locking piece 2811 is installed in the corresponding first through hole 212. Specifically, a first end of each locking piece 2811 comprise a snapping portion 28111 corresponding to a position of a corresponding first through hole 212. A second end of each locking piece 2811 is fixedly connected with a corresponding pressure-bearing piece 2813. Each locking piece 2811 and the corresponding pressure-bearing piece 2813 are integrally formed. Each pressure-bearing piece 2813 is arranged adjacent to or opposite to the corresponding turning disc 2921.

Figure 12:
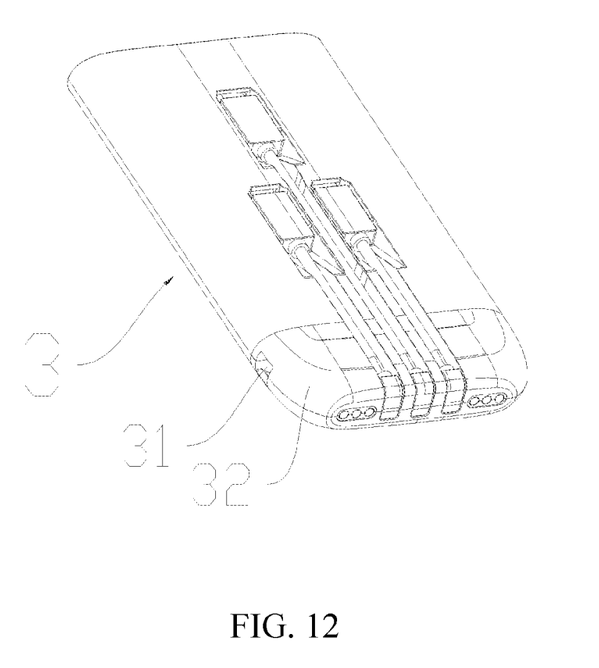
FIG. 12 is a schematic diagram of a mobile power supply according to one embodiment of the present disclosure.

As shown in FIG. 12, each mobile power supply 3 comprises a snapping groove 31 matched with each snapping portion 28111. When each snapping portion 28111 passes through a corresponding first through hole 212 and extends into a corresponding snapping groove 31, each of the locking mechanisms 281 locks the corresponding mobile power supply 3. Each unlocking mechanism 292 gradually presses on one side of a corresponding pressure-bearing piece 2813 through a corresponding pushing surface 292111 and a corresponding pushing boss 29211 when each turning disc 2921 rotates, so that the first end of each locking piece 2811 provided with the snapping portion 28111 moves toward an outer side of the corresponding snapping groove 31 (or in a direction away from the corresponding mobile power supply 3) to move out of the corresponding snapping groove 31 of the corresponding mobile power supply 3. Therefore, each mobile power supply 3 received in the corresponding battery compartment 21 is unlocked.

As shown in FIGS. 5-9, each two locking pieces 2811 corresponding to a same power mechanism 29 are rotatably connected with the corresponding module body 28 by a shaft 293. The battery compartments 21 comprise first shaft holes 213 configured to receive a respective shaft 293. Each of the locking mechanisms 281 comprises a second shaft hole 28112 corresponding to a corresponding shaft 293. Each shaft 293 passes through corresponding first shaft holes 213 and corresponding second shaft holes 28112. Two ends of each shaft 293 is connected with the corresponding module body 28 through fasteners (e.g., screws, screws, etc.). In order to connect each shaft 293 to the corresponding module body 28 by the fasteners, the two ends of each shaft 293 define holes. Further, the two ends of each shaft 293 may have a flat shape (e.g., a square shape). However, the shape of each shaft 293 of the present disclosure is not limited thereto, and each shaft 293 may have any other suitable shape as long as each shaft 293 is fixedly connected with the corresponding module body 28.

Each pushing boss 29211 pushes the corresponding locking mechanism 281 to rotate around a corresponding shaft 293. In this case, each unlocking mechanism 292 gradually presses on one side of a corresponding pressure-bearing piece 2813 through a corresponding pushing surface 292111 and a corresponding pushing boss 29211 when each turning disc 2921 rotates, so that the corresponding locking mechanism 281 rotates around the corresponding shaft 293 along a first direction. Thus, the snapping portion 28111 of each locking piece 2811 moves toward an outer side of the corresponding snapping groove 31 (or in the direction away from the corresponding mobile power supply 3) to move out of the corresponding snapping groove 31 of the corresponding mobile power supply 3. Therefore, each mobile power supply 3 received in the corresponding battery compartment 21 is unlocked.

Specifically, each locking piece 2811 is L-shaped. Each of the power mechanisms 29 is arranged on a rear end of the corresponding module body 28. That is, each of the power mechanisms 29 is arranged on the other end of the corresponding module body 28 and is opposite to the position of the corresponding battery compartments 21. A corner position of each locking piece 2811 that is L-shaped and connected to the corresponding pressure-bearing piece 2813 is rotatably connected with the corner position of the corresponding module body 28 through the corresponding shaft 293.

The pressure-bearing pieces 2813 of each of the locking mechanisms 281 are arranged on the rear end of the corresponding module body 28, and at least a portion of each pressure-bearing piece 2813 is arranged opposite to the corresponding power mechanism 29. The locking piece 2811 of each of the locking mechanisms 281 extend along the side of the corresponding module body 28 (for example, extend in the corresponding first through holes 212). Each snapping portion 28111 on each of the locking mechanisms 281 corresponds to the corresponding first through hole 212, which further make the structure of the charging cabinet units 2 compact.

Figure 4:
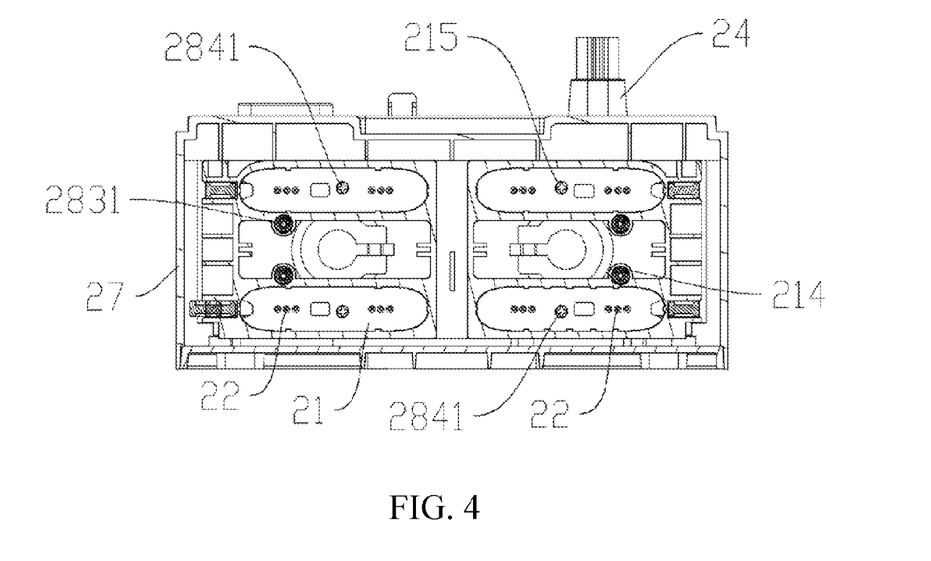
FIG. 4 is cross-sectional schematic diagram of the charging cabinet unit according to one embodiment of the present disclosure.
Figure 10:
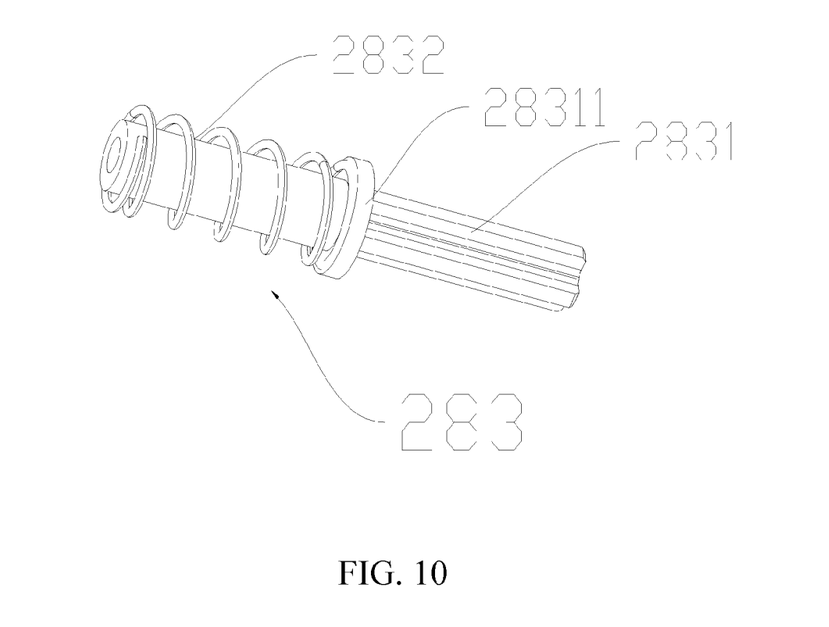
FIG. 10 is a schematic diagram of an elastic reset mechanism according to one embodiment of the present disclosure.

As shown in FIGS. 4 and 10, each of the locking mechanisms 281 further comprises an elastic reset mechanism 283 configured to push a corresponding locking piece 2811 to lock the corresponding mobile power supply 3. After the user takes out one unlocked mobile power supply 3, a corresponding elastic reset mechanism 283 pushes a corresponding locking piece 2811 to reset, so that the corresponding locking piece 2811 return to a position where the previous mobile power supply 3 is locked. When the user returns one mobile power supply 3, the user pushes the mobile power supply 3 into the corresponding battery compartment 21, and the mobile power supply 3 pushes the corresponding snapping portion 28111 out of the corresponding battery compartment 21. When the snapping groove 31 of the mobile power supply 3 reaches a position corresponding to the corresponding snapping portion 28111, the corresponding elastic reset mechanism 283 pushes the corresponding locking piece 2811 to reset again, thereby locking the mobile power supply 3.

In some embodiments, each elastic reset mechanism 283 comprises a first pushing rod 2831 and a first elastic piece 2832 configured to push the first pushing rod 2831. Each of the battery compartments comprises a first mounting hole 214 corresponding to each first pushing rod 2831. A first end of each first pushing rod 2831 of is arranged in a corresponding first mounting hole 214. A second end of each first pushing rod abuts against a corresponding pressure-bearing piece. A first protrusion 28311 is arranges on each first pushing rod 2831. Each first protrusion 28311 is arranged around a corresponding first pushing rod 2831, so each first pushing rod 2831 is divided into a first portion and a second portion. Each first elastic piece 2832 is sleeved on the first portion of each first pushing rod. A length of the first protrusion 28311 in a radial direction of each first pushing rod 2831 is greater than a diameter of each first elastic piece 2832. A diameter of each first mounting hole 214 is greater than a diameter of the first part of each first pushing rod 2831 and is less than the diameter of each first elastic piece 2832. Therefore, the first portion of each first pushing rod 2831 extends into a corresponding battery compartment 21 through the first mounting hole 214. One end of the second portion of each first pushing rod 2831 abuts against a corresponding pressure-bearing piece 2813. For example, the one end of the second portion of each first pushing rod 2831 abuts against the other side of the corresponding pressure-bearing piece 2813 opposite to the side of the corresponding pressure-bearing piece 2813 facing the corresponding turning disc 2921. When one unlocking mechanism 292 pushes a corresponding locking piece 2811 to move in the first direction to unlock a corresponding mobile power supply 3 in a corresponding battery compartment 21, the pressure-bearing piece 2813 corresponding to the one unlocking mechanism 292 abuts against the second portion of the corresponding first pushing rod 2831 and pushes the first portion of a corresponding first pushing rod 2831 to extend into the corresponding battery compartment 21. At this time, a corresponding first elastic piece 2832 is compressed to generate elastic force. When the one unlocking mechanism 292 is reset, the corresponding first elastic piece 2832 is reset under action of elastic restoring force, a corresponding locking piece 2811 is pushed to rotate in the second direction opposite to the first direction to reset.

As shown in FIGS. 5 and 6, each of the locking mechanisms 281 further comprises a detection device 2812. In one embodiment, each detection device 2812 is disposed on a corresponding module body 28. A trigger portion 28213 is arranged on each of the locking mechanisms 281. During a process of unlocking one mobile power supply 3 in a corresponding battery compartment 21 by a corresponding unlocking mechanism 292, a corresponding triggering portion 28213 moves along with rotation of a corresponding locking mechanism 281. When a corresponding detection device 2812 detects that the corresponding trigger portion 28213 reaches a predetermined position, a corresponding motor 291 no longer rotates in a current direction. At this time, a corresponding snapping portion 28111 of the corresponding locking mechanism 281 moves out of the snapping groove 31 of the mobile power supply 3, and the mobile power supply 3 is unlocked. Each detection device 2812 determines a position of a corresponding locking piece 2811 by detecting the position of the corresponding trigger portion 28213. When the user returns the mobile power supply 3 to the corresponding battery compartment 21, the mobile power supply 3 pushes the corresponding snapping portion 28111 out of the corresponding battery compartment 21, and the snapping groove 31 of the mobile power supply 3 is moved to the position corresponding to the corresponding first through hole 212, the corresponding snapping portion 28111 re-enters the corresponding battery compartment 21 and snaps into the snapping groove 31 under the action of the elastic restoring force of the corresponding elastic reset mechanism 283. Therefore, in the process of returning the mobile power supply 3, the corresponding trigger portion 28213 has two actions of moving and resetting with movement and resetting of the corresponding snapping portion 28111. When the user puts papers or other hard objects into the corresponding battery compartment 21, the corresponding snapping portion 28111 is unable to move or reset, so the corresponding trigger portion 28213 is unable to move or reset. When the corresponding detection device 2812 detects that the corresponding trigger portion 28213 is not moved or reset, the corresponding detection device 2812 does not send a signal that indicates the mobile power supply 3 is returned successfully.

In some embodiments, each detection device 2812 is a photoelectric switch. Each detection device 2812 comprises, for example, a photoelectric signal transmitter (not shown in the drawings), a photoelectric signal receiver (not shown in the drawings), and a detection groove 28121. The photoelectric signal transmitter and the photoelectric signal receiver of each detection device 2812 are respectively arranged on two sides of the detection groove 28121 of each detection device 2812. Each photoelectric signal transmitter transmits a photoelectric signal such as a laser photoelectric signal or an infrared photoelectric signal. Each photoelectric signal transmitter transmits a light signal from one side of each detection groove 28121 to the other side of each detection groove 28121. Each trigger portion 28213 is a light blocking plate. When each unlocking mechanism 292 gradually presses the corresponding pressure-bearing piece 2813 through the pushing surface 292111 and the pushing boss 29211 of the corresponding turning disc 2921, the corresponding trigger portion 28213 moves into a corresponding detection groove 28121 along with the rotation of each unlocking mechanism 292. Specifically, when one snapping portion 28111 rotates around a corresponding shaft 293 to move out of a corresponding battery compartment 21, a corresponding light blocking plate 28213 moves into a corresponding detection groove 28121 along with rotation of the snapping portion 28111. The light blocking plate blocks the photoelectric signal from transmitting from one side of the corresponding detection groove 28121 to the other side of the corresponding detection groove 28121. When a corresponding photoelectric signal receiver is unable to receive the photoelectric signal transmitted by a corresponding photoelectric signal transmitter, the system determines that the mobile power supply 3 is not returned successfully. In addition, when the corresponding photoelectric signal receiver always receives the photoelectric signal transmitted by the corresponding photoelectric signal transmitter, the system also determines that the mobile power supply 3 is not returned successfully. By arranging the photoelectric signal transmitters, the photoelectric signal receivers and the detection grooves 28121, a problem that a criminal stealing the mobile power supply 3 through false return is effectively solved. Further, assembly of the mobile power supply rental device is simple and the cost is low.

Figure 11:
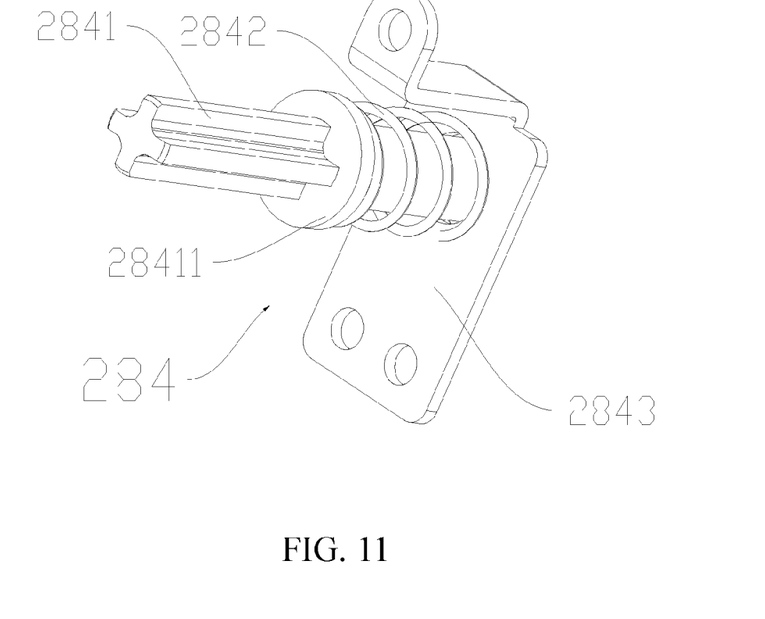
FIG. 11 is a schematic diagram of an elastic pushing mechanism according to one embodiment of the present disclosure.

As shown in FIG. 11, an elastic pushing mechanism 284 is arranged on each of the module bodies 28.

When one unlocking mechanism 292 pushes the corresponding locking piece 2811 to move and the corresponding snapping portion 28111 is moved out of the corresponding snapping groove 31 of the one mobile power supply 3, one end of the corresponding elastic pushing mechanism 284 extends into the corresponding battery compartment 21 to push the one mobile power supply 3, so the one mobile power supply is moved out of the corresponding battery compartment 21 for a certain distance, which is convenient for the user to take out the mobile power supply 3 from the battery compartment 21 instead of slowly pulling out the mobile power supply 3. Each elastic pushing mechanism 284 comprises a second pushing rod 2841, a second elastic piece 2842 configured to push the second pushing rod 2841, and a fixing piece 2843. One end of each second pushing rod extends into a corresponding battery compartment 21 from a bottom portion of the corresponding battery compartment 21. That is, one end of each second pushing rod 2841 toward an opening of the corresponding battery compartment 21 extends into the corresponding battery compartment 21. Each second pushing rod 2841 is movably arranged on a corresponding fixing piece 2843. Each fixing piece 2843 and corresponding fixing ears 2911 are fixed on the outer wall of the corresponding mounting cavity 211 by screws, rivets, screw rods, etc. A second protrusion 28411 is arranges on each second pushing rod 2841. Each second protrusion 28411 is arranged around a corresponding second pushing rod 2841, so each second pushing rod 2841 is divided into a third portion and a fourth portion. Each second elastic piece 2842 is sleeved on the fourth portion of each second pushing rod and is arranged between a corresponding second protrusion 28411 and a corresponding fixing piece 2843. A length of the second protrusion 28411 in a radial direction of each second pushing rod 2841 is greater than a diameter of each second mounting hole 215. Each of the battery compartments 21 comprises a second mounting hole 215 corresponding to each second pushing rod 2841. The third portion of each second pushing rod extends into the corresponding battery compartment 21 through a corresponding second mounting hole 215. Each fixing piece 2843 defines a hole. A portion of each second elastic piece 2842 is clamped in the hole of the corresponding fixing piece, and the fourth portion of each second pushing rod 2841 is slidably arranged in the hole of the corresponding fixing piece. Therefore, each second pushing rod 2841 is movable relative to the corresponding fixing piece 2843 via the hole of the corresponding fixing piece 2843 and the corresponding second elastic piece 2842. Therefore, when the corresponding snapping portion 28111 locks the one mobile power supply 3, the one mobile power supply 3 abuts against and pushes the third portion of a corresponding second pushing rod 2841 passing through the corresponding second mounting hole 215, and a corresponding second elastic piece 2842 is compressed between the corresponding second protrusion 28411 and the corresponding fixing piece 2843. When the corresponding snapping portion 28111 rotates and moves out of the snapping groove 31, the corresponding second elastic piece 2842 pushes the corresponding second pushing rod 2841 to move into the corresponding battery compartment 21 under the action of the elastic restoring force through the corresponding second protrusion 28411 on the corresponding second pushing rod, so that the one mobile power supply 3 is pushed out of the corresponding battery compartment 21. In one embodiment, specifications of each first pushing rod 2831 and each second pushing rod 2841 are the same and specifications of each first elastic piece 2832 and each second elastic piece 2842 are the same, which facilitate manufacturing and processing. For example, each first elastic piece 2832 and each second elastic piece 2842 may be springs, but the present disclosure is not limited thereto.

As shown in FIGS. 6 and 12, each of the battery compartments 21 comprises a narrowed compartment section 216. Each narrowed compartment section 216 gradually narrows along a direction in which each mobile power supply 3 is inserted into each of the battery compartments 21. Each first through hole 212 is on a side wall of a corresponding narrowed compartment section 216.

Correspondingly, one end of a casing of each mobile power supply 3 defines a narrowed portion 32. Each narrowed portion 32 indicates a return direction of each mobile power supply 3. Each narrowed portion 32 corresponds to each narrowed compartment section 216. A cross-sectional area of each narrowed portion 32 gradually decreases along an extending direction of one end where each narrowed compartment portion 32 is located. For example, the cross-sectional area of each narrowed portion 32 in a direction perpendicular to the return direction of each mobile power supply 3 gradually decreases along the return direction of each mobile power supply 3. When returning the one mobile power supply 3, the user can put the one mobile power supply 3 into the corresponding battery compartment according to the returning direction indicated by the narrowing portion 32 of the one mobile power supply 3. In addition, when returning the mobile power supply 3, the user is able to easily tell the narrowed portion 32 of the one mobile power supply, and quickly confirm which end of the one mobile power supply 3 that should be put into the corresponding battery compartment according to the return direction indicated by the narrowed portion 32 of the one mobile power supply 3, so as to put the one mobile power supply 3 into the corresponding battery compartment 21, which improves the return efficiency of the one mobile power supply 3.

In one embodiment, each first through hole 212 is on the side wall of each narrowed compartment section 216. Correspondingly, the snapping groove 31 of each mobile power supply is provided on the narrowed portion 32 of each mobile power supply. When a tool such as hard paper or metal sheet is inserted into one of the battery compartments to steal a corresponding mobile power supply, the tool is difficult to bend to reach a position of a corresponding snapping groove 31. Thus, the anti-theft performance of the mobile power supplies is improved.

Embodiment 2

As shown in FIGS. 1-6, the embodiment of the present disclosure provides a mobile power supply rental device.

The mobile power supply rental device comprises a host 1 and at least one charging cabinet unit 2.

The at least one charging cabinet unit 2 comprises one or more battery compartments 21, one or more charging terminals 22, a power input terminal 23, a power output terminal 24, and a circuit board 25. The battery compartments 21 are configured to receive a respective mobile power supply 3. When each mobile power supply 3 is received in a corresponding battery compartment 21, each of the charging terminals 22 directly contact and charge a corresponding mobile power supply 3. The power input terminal 23 of one of the charging cabinet units 2 is electrically connected with a power socket. The current input through the power input terminal 23 of one of the charging cabinet units 2 is output from the power output terminal 24 of the one of the charging cabinet units 2 to the power input terminal 23 of another mobile power supply rental device (or another charging cabinet unit 2). Each of the charging terminals 22 is electrically connected with the corresponding circuit board 25. Each circuit board 25 outputs direct current to corresponding charging terminals 22 to charge corresponding mobile power supplies 3.

The host 1 is arranged on the charging cabinet units 2. The host 1 is electrically connected with the charging cabinet units 2. The host 1 sends a control signal to the charging cabinet units 2 through wired or wireless communication to control the charging cabinet units 2. The host 1 is detachably stacked on the at least one charging cabinet unit 2. When multiple charging cabinet units 2 are provided, each of the charging cabinet units 2 are detachably stacked on an adjacent charging cabinet unit 2.

The host 1 and a closest charging cabinet unit 2 are electrically connected through the power output terminal 24 or the power input terminal 23 of the closet charging cabinet unit 2. That is, the closet charging cabinet unit 2 is electrically connected with the host 1 through the power output terminal 24 or the power input terminal 23 of the closest charging cabinet unit 2.

The power input terminal 23 of each of the charging cabinet units 2 is electrically connected with the power output terminal 24 of the adjacent charging cabinet unit 2, so each of the charging cabinet units 2 are electrically connected with the adjacent charging cabinet unit 2. When at least two charging cabinet units are stacked together, the power output terminals 24 and the power input terminals 23 of each two adjacent charging cabinet units 2 are cooperated with each other, and the closest charging cabinet unit 2 adjacent to the host 1 is electrically connected with the host 1. The current from the power supply is input through the host 1 or the power input terminal 23 of one of the charging cabinet units 2, and supplied to the host 1 of the mobile power supply rental device and each of the charging cabinet units 2.

In the present disclosure, through the cooperation of the power input terminals 23 and the power output terminals 24 of the charging cabinet units 4, multiple charging cabinet units 2 are stacked together. Further, when the number of the charging cabinet units 2 is increased, there is no need to increase the number of power sockets and power charging cables. Thus, the number of the charging cabinet units is not limited by the number of the power sockets and/or a length of power charging cables, which saves manufacturing costs and saves floor space. In addition, since the number of charging cabinet units 2 is increased by stacking upward, the floor space of the mobile power supply rental device is not increased.

In one embodiment, the power supply provides direct current. Both of the power input terminals 23 and the power output terminals 24 transmit direct current. There is no need to provide an adapter between each of the power input terminals 23 and a corresponding circuit board 25 for current conversion. That is, the direct current is directly supplied to each circuit board 25, which saves the manufacturing costs of the charging cabinet units 2.

As shown in FIGS. 2 and 3, each of the charging cabinet units 2 further comprises a housing 27. Each power output terminal 24 is a power output female base. Each power output female base 24 extends out from a first end of each housing 27. An insulating layer 241 is wrapped around a conductor portion of each power output female base 24. Each insulating layer 241 extends along an extending direction of a corresponding conductor portion to wrap the corresponding conductor portion that leaks out of the corresponding housing 27 in the insulating layer 241, so as to prevent a staff from accidentally touching the corresponding conductor portion and getting an electric shock when stacking and adding charging cabinet units 2. Therefore, safety performance of the mobile power supply rental device is improved. Each power input terminal 23 is a power input male head. An accommodating cavity 231 corresponding to a position of the power output female base of the adjacent charging cabinet unit is provided on a second end of each housing 27. Each power input male head is arranged in a corresponding accommodating cavity 231. Each accommodating cavity 231 is recessed into the corresponding housing 27, so that it is not easy for the staff to access the power input terminal 23 arranged in each accommodating cavity 231 during a process of carrying the charging cabinet units or mounting the charging cabinet units, which effectively eliminates the hidden danger of accidental electric shock. When the charging cabinet units 2 are connected with each other, the power output female base of each of the charging cabinet units is snapped into the accommodating cavity 231 of the adjacent charging cabinet unit 2 and is plugged with the power input male head arranged in the accommodating cavity 231 of the adjacent charging cabinet unit 2, which realize current transmission between each two adjacent charging cabinet units 2. The arrangement of the accommodating cavities 231 and the power output female bases also plays a role in enhancing connection between the host 1 and the closest charging cabinet unit 2 and connection between each two adjacent charging cabinet units 2.

It should be understood that the above embodiments are only used to illustrate the technical solutions of the present disclosure, but not intend to limit the present disclosure. For those skilled in the art, the technical solutions described in the above embodiments can be modified, or some technical features thereof can be equivalently replaced. All such modifications and replacements shall fall within the protection scope of the appended claims of the present disclosure

What is claimed is:

1. A mobile power supply rental device, comprising: a host and at least one charging cabinet unit;
wherein the at least one charging cabinet unit comprises:
one or more battery compartments configured to receive a respective mobile power supply;
one or more charging terminals configured to charge the mobile power supplies received in the battery compartments;
a power input terminal configured to input current;
a power output terminal configured to output the current; and
a circuit board electrically connected between the power input terminal and the charging terminals;
wherein the host is detachably stacked on the at least one charging cabinet unit, and/or
when multiple charging cabinet units are provided, each of the charging cabinet units are detachably stacked on an adjacent charging cabinet unit; the power input terminal of each of the charging cabinet units is electrically connected with the power output terminal of the adjacent charging cabinet unit; the host is electrically connected with the power input terminal or the power output terminal of a closest charging cabinet unit;
wherein each of the charging cabinet units further comprises module bodies, locking mechanisms, and power mechanisms; wherein each of the module bodies comprises at least two battery compartments; each of the battery compartments is equipped with a corresponding locking mechanism; each two adjacent battery compartments are equipped with a correspondingly power mechanism, each of the power mechanisms comprises a motor capable of rotating forwardly and reversely and an unlocking mechanism driven by the motor;
wherein when each motor rotates forwardly or reversely, each unlocking mechanism pushes a corresponding locking mechanism of a corresponding battery compartment to move, so the corresponding battery compartment is not locked by the corresponding locking mechanism.

2. The mobile power supply rental device according to claim 1, wherein each of the charging cabinet units further comprises a housing; each power output terminal is a power output female base; each power output female base extends out from a first end of each housing; each power input terminal is a power input male head; an accommodating cavity corresponding to a position of each power output female base is provided on a second end of each housing; each power input male head is arranged in a corresponding accommodating cavity;
    wherein when the charging cabinet units are connected together, the power output female base of each of the charging cabinet units is snapped into the accommodating cavity of the adjacent charging cabinet unit and is plugged with the power input male head arranged in the accommodating cavity of the adjacent charging cabinet unit.

3. The mobile power supply rental device according to claim 2, wherein positioning grooves are provided on the first end of the housing of each of the charging cabinet units; positioning bumps are arranged on the second end of the housing of each of the charging cabinet units;
    wherein when the charging cabinet units are connected together, the positioning bumps of the housing of each of the charging cabinet units are snapped into the positioning grooves of the housing of the adjacent charging cabinet unit.

4. The mobile power supply rental device according to claim 3, wherein the positioning bumps of each housing comprise a main positioning bump arranged in a middle portion of the second end of each housing and auxiliary positioning bumps arranged away from the main positioning bump; the positioning grooves of each housing comprise a main positioning groove provided on a middle portion of the first end of each housing and auxiliary positioning grooves provided away from the main positioning groove;
    wherein when the charging cabinet units are connected together, the main positioning bump of the housing of each of the charging cabinet units is snapped into the main positioning groove of the housing of the adjacent charging cabinet unit; the auxiliary positioning bumps of the housing of each of the charging cabinet units are snapped into the auxiliary positioning grooves of the housing of the adjacent charging cabinet unit.

5. The mobile power supply rental device according to claim 4, wherein in a direction along which the charging cabinet units are stacked, the main positioning bump and the auxiliary positioning bumps of each housing are arranged at a lower end of each housing; a raised height of each of the auxiliary positioning bumps or a total height of each of the auxiliary positioning bumps after mounting a foot pad is greater than a raised height of each main positioning bump.

6. The mobile power supply rental device according to claim 3, wherein the positioning bumps of each housing comprise a side positioning bump at an edge position of the first end of each housing; the positioning grooves of each housing comprise a side positioning groove provided on the second end of each housing;
    wherein when the charging cabinet units are connected together, the side positioning bump of the housing of each of the charging cabinet units is snapped into the side positioning groove of the housing of the adjacent charging cabinet unit.

7. The mobile power supply rental device according to claim 6, wherein a portion of the side positioning groove of each housing facing the second end of each housing is open.

8. The mobile power supply rental device according to claim 6, wherein a wiring groove communicating the accommodating cavity and the side positioning groove of the housing of each of the charging cabinet units is provided on the housing of each of the charging cabinet units.

9. The mobile power supply rental device according to claim 3, wherein the positioning bumps of each housing comprise side connecting bumps arranged on an edge position of the first end of each housing; the positioning grooves of each housing comprise side connecting grooves provided on the second end of the housing; a fixing hole is defined on each of the side connecting bumps;
    wherein when the charging cabinet units are connected together, the side connecting bumps of the housing of each of the charging cabinet units are connected with the side connecting grooves of the housing of the adjacent charging cabinet unit through a connecting piece mounted in each fixing hole.

10. The mobile power supply rental device according to claim 2, wherein a first mounting plate is detachably connected with the first end of the housing of each of the charging cabinet units and a second mounting plate is detachably connected with the second end of the housing of each of the charging cabinet units; each first mounting plate is configured to fix a corresponding power output female base; each second mounting plate is configured to fix a corresponding power input male head.

11. The mobile power supply rental device according to claim 10, wherein positioning grooves are provided on the first end of the housing of each of the charging cabinet units; positioning bumps are arranged on the second end of the housing of each of the charging cabinet units;
    wherein when the charging cabinet units are connected together, the positioning bumps of the housing of each of the charging cabinet units are snapped into the positioning grooves of the housing of the adjacent charging cabinet unit.

12. The mobile power supply rental device according to claim 1, wherein each unlocking mechanism comprises a turning disc fixedly connected with an output shaft of each motor; each turning disc comprises a pushing boss facing corresponding locking mechanisms; when each motor rotates, each pushing boss pushes a corresponding locking mechanism to move.

13. The mobile power supply rental device according to claim 12, wherein two sides of each pushing boss define pushing surfaces transitioning from each pushing boss to a surface of a corresponding turning disc; when each turning disc rotates, the pushing surfaces of each pushing boss gradually pushes the corresponding locking mechanism to move.

14. The mobile power supply rental device according to claim 1, wherein a side wall of each of the battery compartments defines a first through hole, and each of the locking mechanisms comprises a locking piece rotatably connected with a corresponding module body and a pressure-bearing piece connected with the locking piece;
    a first end of each locking piece comprises a snapping portion corresponding to a position of a corresponding first through hole; a second end of each locking piece is fixedly connected with a corresponding pressure-bearing piece;
    each pressure-bearing piece is arranged opposite to a corresponding turning disc;

each pushing boss compresses a corresponding pressure-bearing piece when each turning disc rotates, so the first end of each locking piece moves away from a corresponding mobile power supply to unlock the corresponding mobile power supply arranged in a corresponding battery compartment.

15. The mobile power supply rental device according to claim 14, wherein each two locking pieces corresponding to each of the power mechanisms are rotatably connected with the corresponding module body by a same shaft; each pushing boss pushes a corresponding locking piece to rotate around a corresponding shaft along the first direction.

16. The mobile power supply rental device according to claim 14, wherein each of the locking mechanisms further comprises an elastic reset mechanism configured to push a corresponding locking piece to lock the corresponding mobile power supply.

17. The mobile power supply rental device according to claim 16, wherein each elastic reset mechanism comprises a first pushing rod and a first elastic piece configured to push the first pushing rod; each of the module bodies comprises a first mounting hole; a first elastic piece and a first end of the corresponding first pushing rod of each elastic reset mechanism are arranged in a corresponding first mounting hole; a second end of the first pushing rod of each elastic reset mechanism is configured to push a corresponding pressure-bearing piece under action of the first elastic piece of each elastic reset mechanism, so the corresponding pressure-bearing piece rotates around a corresponding shaft along a second direction; the second direction is opposite to the first direction.

18. The mobile power supply rental device according to claim 14, wherein each of the battery compartments comprises a narrowed compartment section; each narrowed compartment section gradually narrows along a direction in which each mobile power supply is inserted into each of the battery compartments; each first through hole is on a side wall of a corresponding narrowed compartment section.

19. The mobile power supply rental device according to claim 1, wherein each two locking pieces corresponding to each of the power mechanisms are rotatably connected with the corresponding module body by a same shaft; each pushing boss pushes a corresponding locking piece to rotate around a corresponding shaft along the first direction.

20. The mobile power supply rental device according to claim 19, wherein each of the locking mechanisms further comprises an elastic reset mechanism configured to push a corresponding locking piece to lock the corresponding mobile power supply.

21. The mobile power supply rental device according to claim 1, wherein each of the locking mechanisms further comprises a detection device, a trigger portion is arranged on each of the locking mechanisms; when each detection device detects that a corresponding trigger portion reaches a predetermined position, a corresponding motor no longer rotates in a current direction.

22. The mobile power supply rental device according to claim 21, wherein each detection device is a photoelectric switch.

23. The mobile power supply rental device according to claim 1, wherein an elastic pushing mechanism is arranged on each of the module bodies; each elastic pushing mechanism comprises a second pushing rod and a second elastic piece configured to push the second pushing rod; one end of each second pushing rod toward an opening of a corresponding battery compartment extends into the corresponding battery compartment.

24. The mobile power supply rental device according to claim 1, wherein each of the charging cabinet units further comprises an adapter electrically connected between the power input terminal and the circuit board of each of the charging cabinet units.

* * * * *